United States Patent [19]

Bostick et al.

[11] 4,114,978
[45] Sep. 19, 1978

[54] BURIED GRATING SHARED APERTURE DEVICE

[75] Inventors: Hoyt A. Bostick, Irvine; Paul M. Sutton, Newport Beach; Chester L. Richards, Irvine, all of Calif.

[73] Assignee: The United States of America as represented by the Secretary of the Air Force, Washington, D.C.

[21] Appl. No.: 812,304

[22] Filed: Jul. 1, 1977

[51] Int. Cl.² .................................. G02B 5/18
[52] U.S. Cl. .................. 350/1.7; 350/162 R; 350/169
[58] Field of Search ............ 350/1.7, 162 R, 1.1, 350/166, 169, 172; 250/237 G

[56] References Cited

U.S. PATENT DOCUMENTS

| | | | |
|---|---|---|---|
| 3,334,956 | 8/1967 | Staunton | 350/162 R |
| 3,542,453 | 11/1970 | Kantor | 350/162 R |
| 3,688,109 | 8/1972 | Gamble | 350/162 R |
| 3,698,795 | 10/1972 | Flint | 350/162 R |

Primary Examiner—Ronald J. Stern
Attorney, Agent, or Firm—Joseph E. Rusz; Robert Kern Duncan

[57] ABSTRACT

An incoming longwave infrared beam sharing the same aperture with an outgoing high power laser beam is separated from the laser beam path by a combination of a dichroic mirror and a diffraction grating.

3 Claims, 3 Drawing Figures

BURIED GRATING SHARED APERTURE DEVICE

RIGHTS OF THE GOVERNMENT

The invention described herein may be manufactured and used by or for the Government of the United States for all governmental purposes without the payment of any royalty.

BACKGROUND OF THE INVENTION

The field of the invention is in optical devices and more particularly in that of passive spectral separators. Patents that may be of interest in connection with the background of the case are Nos. 3,688,109 to patentee F. R. Gamble, and 3,698,795 to patentee B. K. Flint.

SUMMARY OF THE INVENTION

A passive optical device is disclosed which provides a spectral separator of high power density laser beams from other beams of lower power having a different wavelength.

DESCRIPTION OF THE PREFERRED EMBODIMENT

Figure 1:
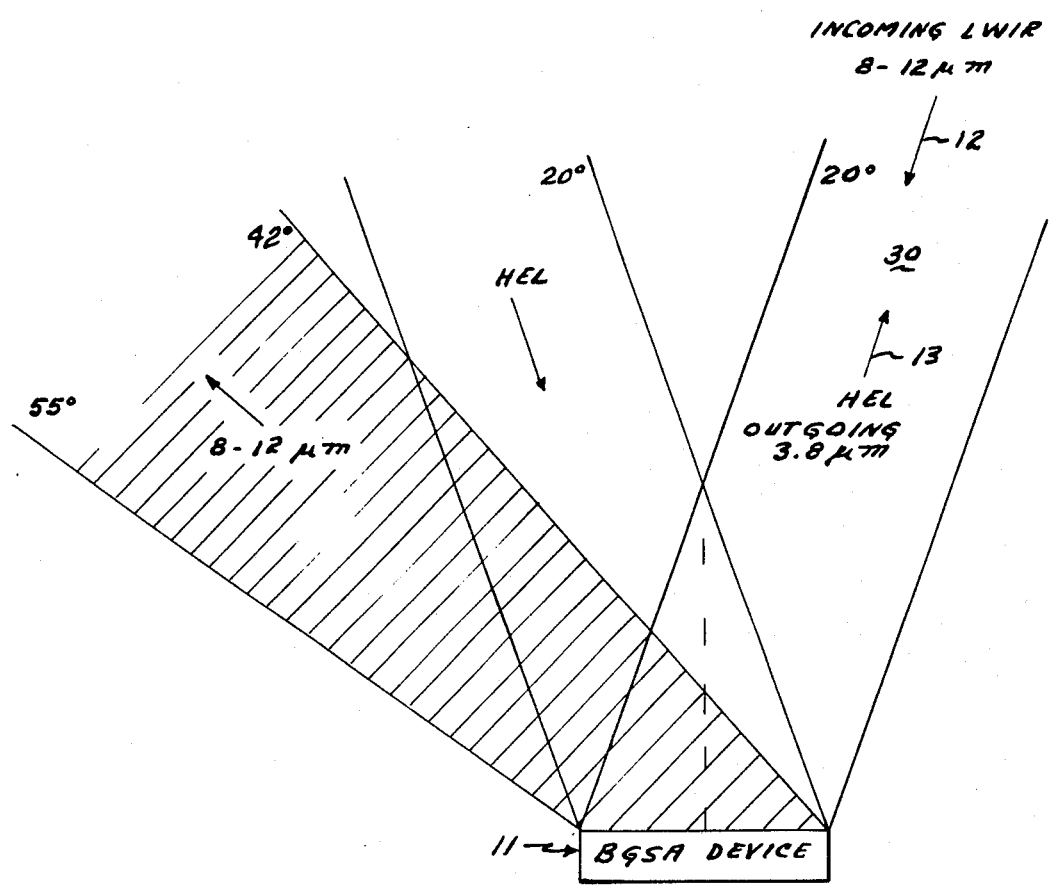
FIG. 1 shows schematically the separation of the two beams.
Figure 2:
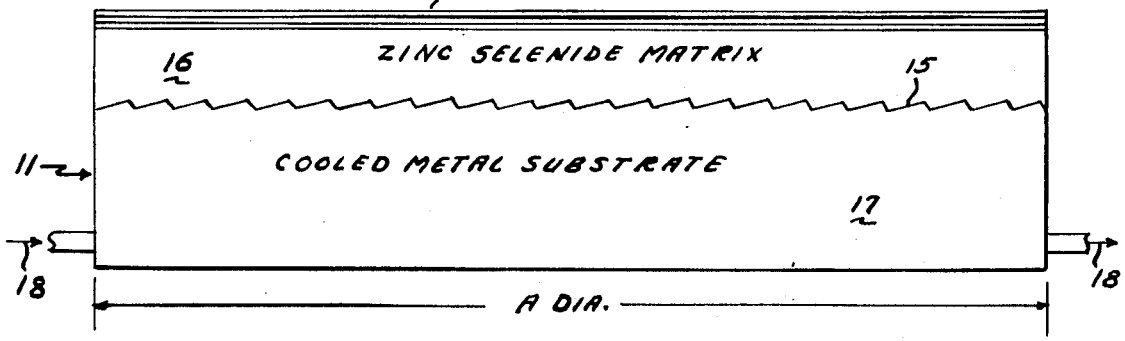
FIG. 2 shows schematically the structure of the invention.
Figure 3:
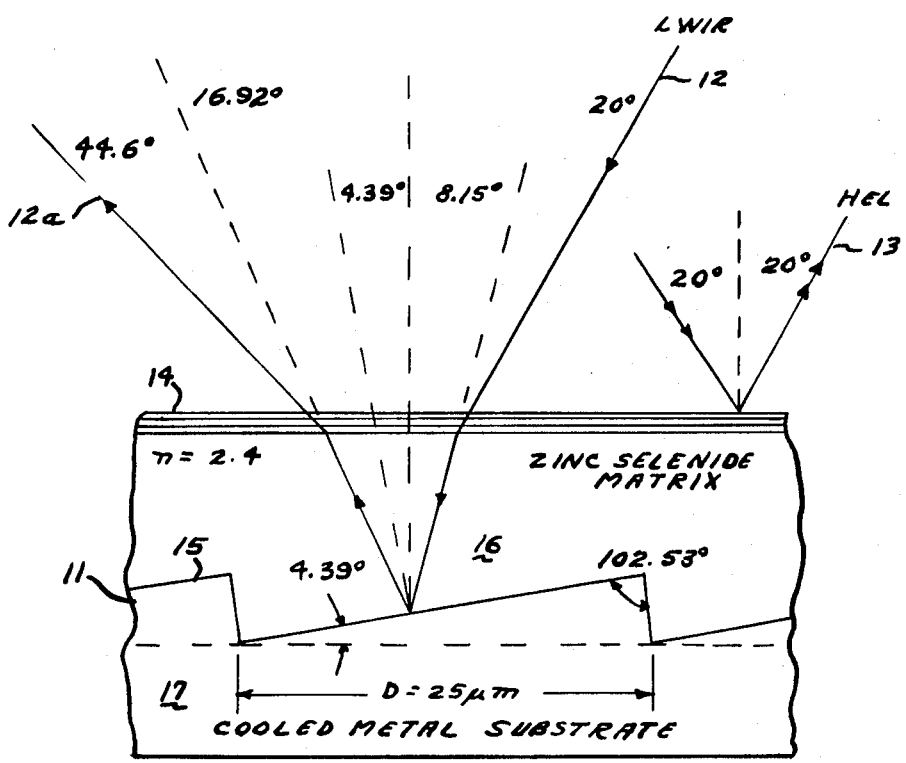
FIG. 3 shows schematically in detail the optical action of the invention.

Referring to FIGS. 1, 2, and 3, the disclosed buried grating shared aperture device 11 separates the incoming long wave infrared (LWIR) target energy beam 12 from the outgoing high energy laser (HEL) beam 13, both sharing a common aperture 30, by a combination of a dichroic mirror 14 and a diffraction grating 15. A thin layer of transparent matrix material 16, such as zinc selenide, is deposited over the diffraction grating 15 ruled into a conventional metal substrate. The dichroic mirror 14 which has a high reflectivity at 3.8 $\mu$m HEL wavelength and good transmission over the 8 to 12 $\mu$m band of incoming LWIR energy, is coated on the flat outer surface of the matrix layer 16. The grating 15 is blazed at such an angle as to efficiently reflect the 8 to 12 $\mu$m energy into the first diffraction order. Because of this diffraction, the LWIR energy arrives at the inner surface of the dichroic coating 14 at a larger angle that when it entered, as illustrated in FIG. 3, and is consequently refracted at the outer surface at a larger angle than the original incidence angle. As is illustrated in FIGS. 1 and 3, the increase in beam incidence angle from the incoming angle of 20° to the angle of 44.6° for the leaving beam 12a, separates the LWIR beam 12a physically from the HEL beam at a suitable distance downstream. An advantage of using a grating to accomplish the internal change of incidence angle of the LWIR beam instead of a wedge layer which would theoretically do the same thing, is that the grating permits the matrix layer 16 to be very thin, typically 1 to 2 mils, which provides efficient conductive cooling of the HEL reflecting dichroic coating 14. An inconvenience of the grating is that it causes angular dispersion of the relatively wide band (8 to 12 $\mu$m) LWIR beam, as illustrated in FIG. 1. If desirable, such dispersion can, however, be corrected by the use of three additional gratings in the LWIR path; with the first grating correcting the angular dispersion and the other two gratings correcting a lateral chromatic pupil displacement introduced by the first. These additional gratings are in a low intensity path and thus do not have to be cooled. In addition, these gratings do not have to be of the buried type but may be ruled into first surface aluminized mirrors.

Typical embodiments of the invention have been fabricated on conventional water cooled HEL mirror bases having diameters from approximately 1.5 inches to 4 inches. Conventionally, a molybdenum heat exchanger is bonded to a thick beryllium structure. The grating is ruled into the 25 mil thick exchanger face sheet and covered with approximately a 1 mil thick coating 16 of zinc selenide. While ZnSe is the preferred covering matrix, CaF$_2$ is also suitable for conventional 9 micron tracker light and designed to operate at a 20° HEL in-out angle. This structure has only one order effective in the general direction of the blaze and has minimal efficiency falloff for the edges of the 8–11.5 micron pass band. As illustrated in FIG. 3, the preferred blaze angle is 4.39° with a groove depth of 1.9 microns and a 25 micron groove spacing, for these stated operating wavelengths. Those skilled in the art will readily adopt the disclosed structure for other wavelengths.

Typical fabrication of embodiments is by polishing a conventional water cooled molybdenum substrate 17 to a mirror finish, $\lambda$/4 figure, 50 A smoothness before ruling. After ruling it is flashed with Chromium, 50 to 100 A thick to bind a following RF bias sputtered gold coating. Zinc selenide 16 is then evaporated at approximately 200° C. over the gold. The surface of the dielectric matrix 16 is then polished flat (one-fourth $\lambda$ flatness in the visible spectrum is generally satisfactory), and the dichroic, dielectric, multi-layer coating 14, that reflects the high power laser beam while transmitting the lower power beam to be separated onto the grating, is applied. Conventional coating with ZnS provides a suitable multi-layer dichroic film 14 that reflects a high power laser beam while transmitting the lower power beam to be separated.

Referring to FIG. 2, the buried grating shared aperture device consists essentially of four major elements; a conventional coolable metal substrate 17, such as the structures conventionally used for high power laser mirrors, with a flow of cooling medium 18 such as water; a blazed diffraction grating is ruled into (or otherwise conventionally produced) in the surface of the substrate; a thin imbedding matrix 16 fully covering the grooves of the grating structure, having its surface polished to optical flatness; and a dielectric multi-layer coating 14 that reflects a high power laser beam while being substantially transparent to a low power beam of a different wavelength. Typical embodiments of the invention are used to separate an incoming infrared beam of approximately 8 to 12 $\mu$m wavelength from a high energy outgoing laser beam of approximately 3.8 $\mu$m wavelength, with the aperture containing the incoming infrared beam and the outgoing laser beam being at an angle of approximately 20° to the normal of the device. Typical power density levels of the HEL are approximately 30 kw/cm$^2$, and with conventional flows of the liquid cooling typical structures as disclosed will survive approximately ten second exposures of the HEL beam.

We claim:

1. A buried grating shared aperture device for separating a high energy laser beam and a low frequency infrared beam both sharing a common aperture, comprising:
 a. a cooled metal substrate having a flat surface;
 b. a blazed diffraction grating fabricated in the said flat surface of the substrate;
 c. A thin imbedding matrix positioned in contacting relationship over the said grating and providing an optically flat surface; and
 d. a multi-layer, dielectric, dichroic coating positioned on the said flat surface.

2. A buried grating shared aperture device for separating an outgoing high energy laser beam of approximately 3.8 μm wavelength from an incoming long wavelength infrared beam of approximately 8 to 12 μm wavelength, both sharing a common 20° in-out aperture, the said device comprising:
 a. a molybdenum substrate having a polished mirror surface;
 b. means for liquid cooling the said substrate;
 c. a blazed diffraction grating ruled into the said polished surface of the substrate;
 d. a zinc selenide dielectric matrix coating positioned over the said grating with its outer surface polished to optical flatness; and
 e. a multi-layer dichroic coating of ZnS positioned on the said dielectric matrix outer surface.

3. The device as claimed in claim 2 wherein the said blazed diffraction grating has a blaze angle of approximately 4.39°, a groove depth of approximately 1.9 microns, and approximately a 25 micron groove spacing.